(12) United States Patent
Mendes et al.

(10) Patent No.: US 10,999,301 B2
(45) Date of Patent: May 4, 2021

(54) METHODS, SYSTEMS, AND PROGRAM PRODUCT FOR ANALYZING CYBER-ATTACKS BASED ON IDENTIFIED BUSINESS IMPACTS ON BUSINESSES

(71) Applicant: International Business Machines Corporation, Armonk, NY (US)

(72) Inventors: Naaliel Vicente Mendes, Hortolandia (BR); Marco Aurelio Stelmar Netto, Sao Paulo (BR); Marcos de Castro Sylos, Ribeirao Preto (BR); Sergio Varga, Campina (BR)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 15/822,938

(22) Filed: Nov. 27, 2017

(65) Prior Publication Data

US 2019/0166137 A1 May 30, 2019

(51) Int. Cl.
| H04L 29/06 | (2006.01) |
| G06F 21/55 | (2013.01) |
| G06F 21/57 | (2013.01) |
| G06F 21/56 | (2013.01) |

(52) U.S. Cl.
CPC ........ *H04L 63/1416* (2013.01); *G06F 21/561* (2013.01); *G06F 21/564* (2013.01); *H04L 63/1408* (2013.01); *H04L 63/1433* (2013.01); *H04L 63/1441* (2013.01); *H04L 2463/146* (2013.01)

(58) Field of Classification Search
CPC ......... H04L 63/14; G06F 21/55; G06F 21/577
See application file for complete search history.

(56) References Cited

U.S. PATENT DOCUMENTS

| 7,281,270 | B2 | 10/2007 | Piesco et al. |
| 7,813,947 | B2 | 10/2010 | DeAngelis et al. |
| 7,913,303 | B1 | 3/2011 | Rouland et al. |

(Continued)

OTHER PUBLICATIONS

Su, Xiaomeng et al.; "A Business Goal Driven Approach for Understanding and Specifying Information Security Requirements"; University of Twente; the Netherlands; pp. 8.

(Continued)

*Primary Examiner* — Jason Chiang
(74) *Attorney, Agent, or Firm* — Kelli D. Morin (57) ABSTRACT

Methods, systems, and program products for analyzing cyber-attacks on computing systems of a business are disclosed. The methods may include detecting each of the plurality of cyber-attacks. The plurality of cyber-attacks may target information systems stored on at least one information technology (IT) component of an infrastructure of the computing system of the business. The methods may also include determining cyber-attack data relating to the plurality of cyber-attacks, identifying a business impact on the business for each of the plurality of cyber-attacks. The identified business impact on the business for the plurality of cyber-attacks may be based on predetermined business impact data and the determined cyber-attack data. Additionally, the method may include prioritizing the plurality of cyber-attacks attempted on the computing system based on the identified business impact on the business for each of the plurality of cyber-attacks.

17 Claims, 5 Drawing Sheets

(56) References Cited

U.S. PATENT DOCUMENTS

| | | | |
|---|---|---|---|
| 8,099,760 B2 | 1/2012 | Cohen et al. | |
| 9,270,695 B2* | 2/2016 | Roytman | H04L 63/1433 |
| 9,426,169 B2* | 8/2016 | Zandani | H04L 63/1433 |
| 9,749,343 B2* | 8/2017 | Watters | H04L 63/20 |
| 9,992,219 B1* | 6/2018 | Hamlet | G06F 16/9024 |
| 2005/0138413 A1* | 6/2005 | Lippmann | G06F 21/577 726/4 |
| 2005/0193430 A1* | 9/2005 | Cohen | G06F 21/577 726/25 |
| 2008/0010225 A1* | 1/2008 | Gonsalves | G06N 7/005 706/11 |
| 2009/0138592 A1* | 5/2009 | Overcash | H04L 63/1425 709/224 |
| 2010/0153156 A1 | 6/2010 | Guinta et al. | |
| 2010/0333002 A1* | 12/2010 | Karabey | G06Q 10/10 715/764 |
| 2013/0104236 A1* | 4/2013 | Ray | H04L 63/1433 726/25 |
| 2014/0283050 A1 | 9/2014 | Striem Amit | |
| 2016/0226893 A1* | 8/2016 | Warikoo | H04L 63/1416 |
| 2016/0248805 A1* | 8/2016 | Burns | H04L 63/1433 |
| 2017/0171235 A1* | 6/2017 | Mulchandani | H04L 63/1425 |
| 2018/0137288 A1* | 5/2018 | Polyakov | G06F 21/552 |

OTHER PUBLICATIONS

Khanmohammadi, Kobra et al.; "Business Process-based Information Security Risk Assessment"; 2010 Fourth International Conference on Network and System Security; IEEE Computer Society; Copyright 2010 IEEE; pp. 199-206.

Tjoa, Simon et al.; "Enhancing Business Impact Analysis and Risk Assessment Applying a Risk-Aware Business Process Modeling and Simulation Methodology"; IEEE Xplore; May 23, 2008; Conference Date Mar. 4-7, 2008; Copyright 2017 IEEE; pp. 3; <http://ieeexplore.ieee.org/document/4529336/>.

Unknown; "A risk-based approach to securing the cyber ecosystem"; Security Risk Analytics; the Cyber Threat Landscape; Printed Feb. 15, 2017; pp. 5; <http://www.greenlightcorp.com/security-risk-analytics/>.

Mazzola, Cory; "The Business of Cyber Risk Assessment for Data Security"; Apr. 15, 2015; Printed Feb. 15, 2017; pp. 6; <https://securityintelligence.com/author/cory-mazzola/>.

Unknown; "Tie Incident Response to Business Processes, Prioritize and Automate Remediation"; algosec; Copyright 2017 Algosec, Inc.; pp. 2.

Sawilla et al., "Identifying Critical Attack Assets in Dependency Attack Graphs," S. Jajodia, and J. Lopex (Eds.): ESORICS 2008, LNCS 5283, pp. 18-34, 2008, © Springer-Verlag Berlin Heidelberg 2008.

* cited by examiner

METHODS, SYSTEMS, AND PROGRAM PRODUCT FOR ANALYZING CYBER-ATTACKS BASED ON IDENTIFIED BUSINESS IMPACTS ON BUSINESSES

TECHNICAL FIELD

The disclosure relates generally to analyzing cyber-attacks on computing systems of a business, and more particularly to methods, systems, and program products for analyzing, prioritizing, and mitigating cyber-attacks based on identified business impacts of the cyber-attacks on the business.

BACKGROUND

The evaluation of computer-based system security has become a very relevant subject, especially for those who use computer systems to support critical business missions or to store confidential information. However, with the increased reliance on computer-based systems by businesses, computer-based system security continues to be crucial in protecting business operations; especially as computer-based systems become more complex, interconnected, pervasive, and are frequently threatened by many types of attacks (e.g., cyber-attacks). These attacks are unavoidable, as the root causes for them are tied up to human aspects that cannot be removed (e.g., intention to cause harm, intention to steal information, etc.), and the losses that attacks can cause to their targets, when successful, can be very significant and/or detrimental to businesses.

While security measures, systems, and/or programs exist, the conventional systems operate with very linear processes that do not take into account other information and/or data when processing these attacks. For example, an intrusion detection system (IDS) is one of the solutions deployed to monitor the network or systems for malicious activity or policy violations. Once the IDS detects an activity or violation it usually reports to an administrator or to a central log using a security information and event management (STEM) system. The SIEM system collects outputs from multiple sources, and uses alarm filtering techniques to distinguish malicious activity from false alarms. In general, IDS and/or SIEM systems identify detected attack on high levels of the computer-based systems (e.g., infrastructure or component level). Additionally in conventional security systems, the attacks and associated risks can only be identified based on predefined framework. These predefined frameworks are specific to the high level detect or analysis of the computer-based system and do not consider additional information (e.g., external or supplemental information independent of the computer-based system under attack) when detecting attacks. Finally, conventional security systems may only detect and/or analyze attacks on computer-based systems one at a time. As such, a computer-based system under multiple, simultaneous attacks may be more vulnerable and/or negatively impacted by the attacks because of detection limitations or capabilities (e.g., single attack detection) of conventional security systems for computer-based systems.

SUMMARY

Aspects of the disclosure provide methods, systems, and program products for analyzing, prioritizing, and mitigating cyber-attacks based on identified business impacts of the cyber-attacks on the business.

A first aspect discloses a method for analyzing cyber-attacks. The method includes: detecting each of the plurality of cyber-attacks attempted on a computing system of a business, each of the plurality of cyber-attacks targeting information systems stored on at least one information technology (IT) component of an infrastructure of the computing system of the business; determining cyber-attack data relating to each of the plurality of cyber-attacks attempted on the computing system of the business; identifying a business impact on the business for each of the plurality of cyber-attacks attempted on the computing system of the business, the identified business impact on the business for each of the plurality of cyber-attacks based on predetermined business impact data and the determined cyber-attack data; and prioritizing the plurality of cyber-attacks attempted on the computing system based on the identified business impact on the business for each of the plurality of cyber-attacks attempted on the computer system.

A second aspect discloses a computer program product stored on a computer readable storage medium, which when executed by a computing system of a business, analyzes a plurality of cyber-attacks. The program product includes: program code that detects each of the plurality of cyber-attacks attempted on the computing system of the business, each of the plurality of cyber-attacks targeting information systems stored on at least one information technology (IT) component of an infrastructure of the computing system of the business; program code that determines cyber-attack data relating to each of the plurality of cyber-attacks attempted on the computing system of the business; program code that identifies a business impact on the business for each of the plurality of cyber-attacks attempted on the computing system of the business, the identified business impact on the business for each of the plurality of cyber-attacks based on predetermined business impact data and the determined cyber-attack data; and program code that prioritizes the plurality of cyber-attacks attempted on the computing system based on the identified business impact on the business for each of the plurality of cyber-attacks attempted on the computer system.

A third aspect discloses a computing system of a business for analyzing a plurality of cyber-attacks. The computing system includes: a cyber-attack data module that: detects each of the plurality of cyber-attacks attempted on the computing system of the business, each of the plurality of cyber-attacks targeting information systems stored on at least one information technology (IT) component of an infrastructure of the computing system of the business; and determines cyber-attack data relating to each of the plurality of cyber-attacks attempted on the computing system of the business; a predetermined business impact data module that identifies a business impact on the business for each of the plurality of cyber-attacks attempted on the computing system of the business, the identified business impact on the business for each of the plurality of cyber-attacks based on predetermined business impact data of the predetermined business impact data module and the cyber-attack data determined by the cyber-attack data module; and a cyber-attack prioritization data module that prioritizes the plurality of cyber-attacks attempted on the computing system based on the identified business impact on the business for each of the plurality of cyber-attacks attempted on the computer system The illustrative aspects of the present disclosure solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to analyzing cyber-attacks on computing systems of a business, and more particularly to methods, systems, and program products for analyzing, prioritizing, and mitigating cyber-attacks based on identified business impacts of the cyber-attacks on the business.

These and other embodiments are discussed below with reference to FIGS. 1-5. However, those skilled in the art will readily appreciate that the detailed description given herein with respect to these Figures is for explanatory purposes only and should not be construed as limiting.

Figure 1:
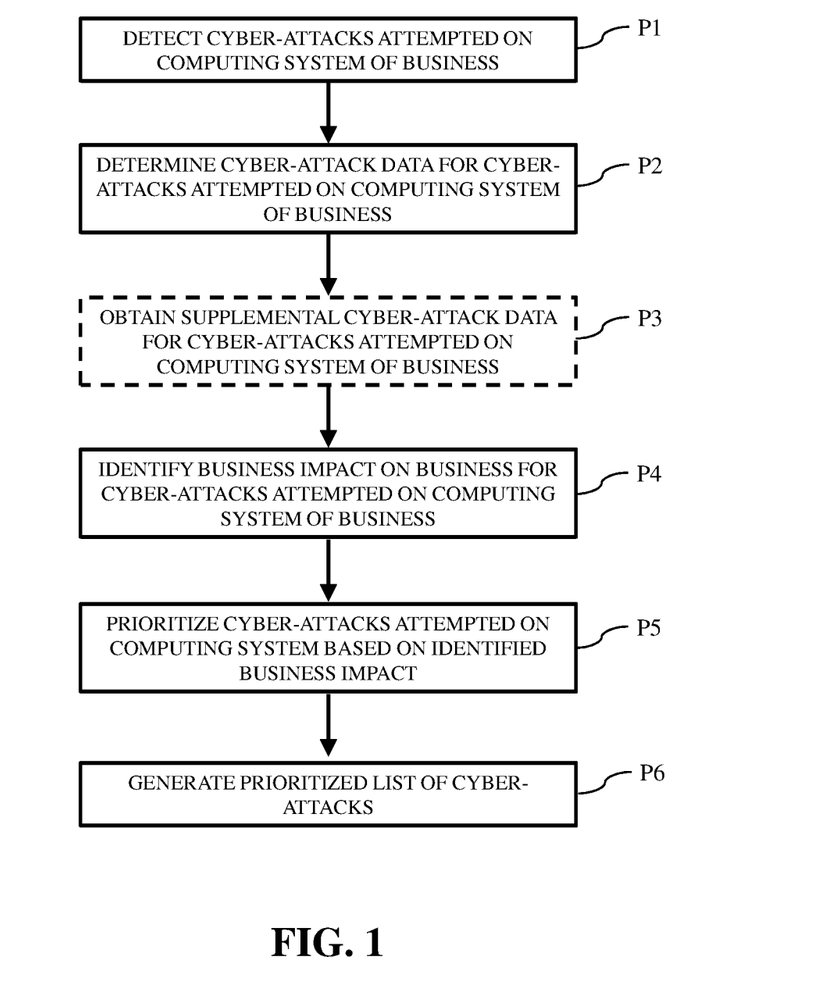
FIG. 1 depicts a flow chart of example processes for analyzing a plurality of cyber-attacks attempted on a computing system of a business, according to embodiments.
Figure 2:
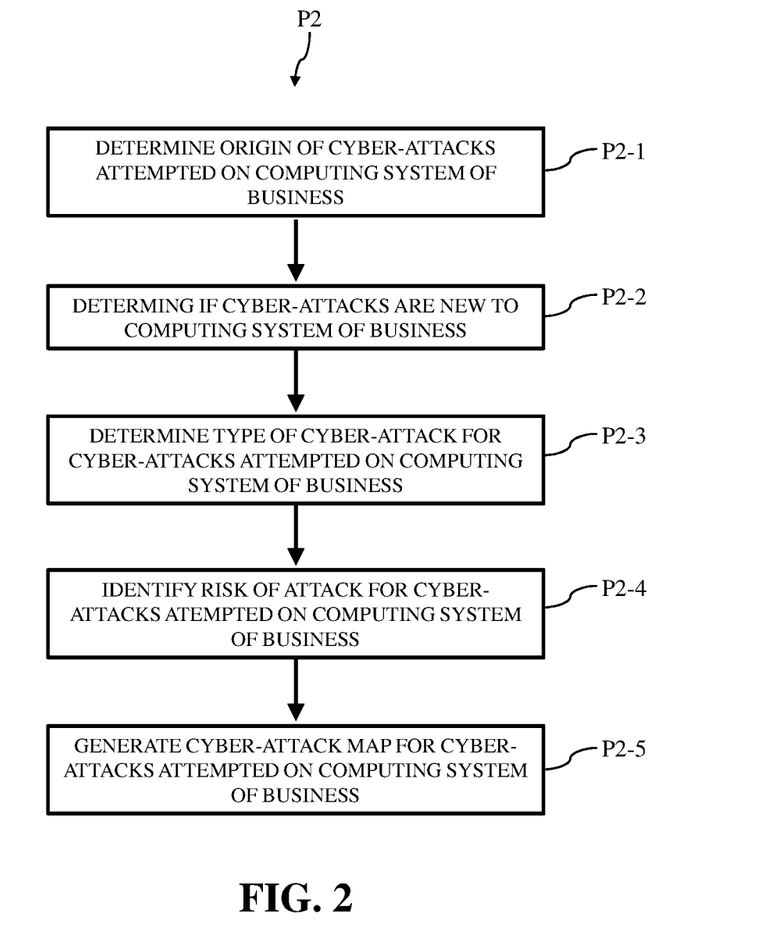
FIG. 2 depicts a flow chart of example processes of determining cyber-attack data relating to each of the plurality of cyber-attacks attempted on the computing system of the business, as shown in FIG. 1, according to embodiments.
Figure 3:
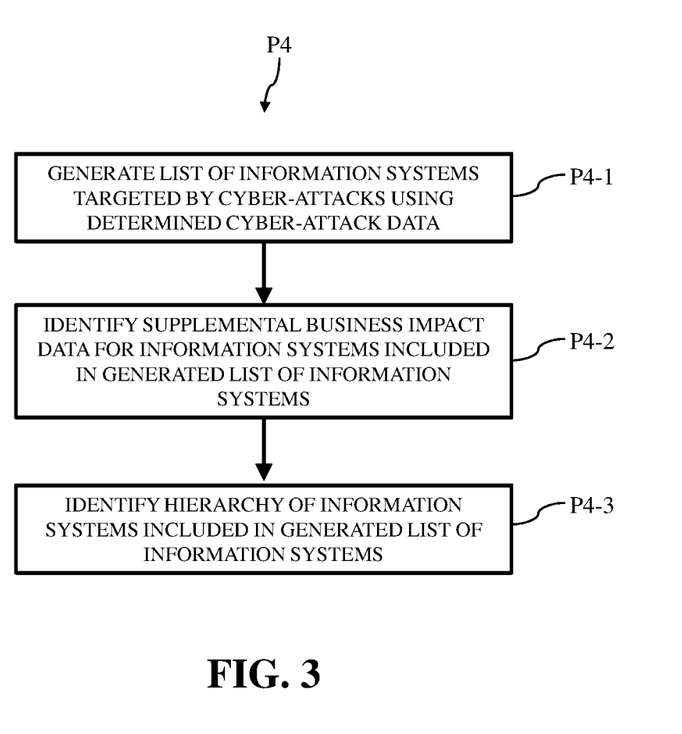
FIG. 3 depicts a flow chart of example processes of identifying a business impact on the business for each of the plurality of cyber-attacks attempted on the computing system of the business, as shown in FIG. 1, according to embodiments.

FIGS. 1-3 show various flow diagrams illustrating non-limiting example processes for analyzing, prioritizing, and mitigating cyber-attacks based on identified business impacts of the cyber-attacks on the business. Specifically, FIG. 1 shows a flow diagram illustrating a non-limiting example of processes for analyzing a plurality of cyber-attacks attempted on a computing system of a business, FIG. 2 shows non-limiting example processes for a determining cyber-attack data process (e.g., process P2) of FIG. 1, and FIG. 3 shows non-limiting example processes for an identifying business impacts on the business process (e.g., process P4) of FIG. 1. These processes can be performed, e.g., by at least one computing device of a computing system (see, FIG. 5), as described herein. In other cases, these processes can be performed according to a computer-implemented method for analyzing a plurality of cyber-attacks attempted on a computing system of a business. In still other embodiments, these processes can be performed by executing computer program code on the computing device(s) included in at least one computing device, causing the computing device(s) to analyze a plurality of cyber-attacks attempted on a computing system of a business.

Initially, and for purposes of clarity, the terms "computing system of a business" and "business computing system" may be used interchangeably. As such, the terms "computing system of a business" and "business computing system" are understood to reference the same computing system, and infrastructure, components, and/or information included therein, associated with a business.

Turning to FIG. 1, in process P1 a plurality of cyber-attacks may be detected. Specifically, each of a plurality of cyber-attacks attempted on a computing system of and/or associated with a business may be detected, sensed, and/or identified. The computing system of and/or associated with the business may be at least one computing system that may include, for example, information (e.g., client list, product list, calendar of business events, and the like), and/or computing components (e.g., servers, storage, programs, networks, and the like) pertaining to the business and/or the operation of the business. In non-limiting examples, the computing system of the business may include at least one computing device and/or information technology (IT) infrastructure including at least one IT component, and at least one information system included or stored within the IT component.

As such, each of the plurality of detected cyber-attacks attempted on the computing system of the business may target information system(s) stored on the IT component(s) of the infrastructure and/or computing device of the computing system of the business. Specifically, the cyber-attacks may target at least one information system to access, steal, alter, disrupt, and/or destroy the information included within the information system. For example, the cyber-attacks may target, and more specifically access, steal and/or copy, information systems stored on the IT component(s) of the infrastructure and/or computing device of the computing system of the business including user sensitive information (e.g., home addresses, credit card numbers, social security numbers, and the like). In another non-limiting example, the cyber-attacks may target, and more specifically access, disrupt and/or destroy, information systems including information, data, or program code relating to the point of sales system on a website to prevent the business from being able to sell an item. Detecting each of the plurality of cyber-attacks attempted on the computing system of the business may, for example, be accomplished using programs, IT components and/or systems (e.g., intrusion detection systems (IDS), security information and event management (STEM) systems, and the like) included within the computing system of the business, as discussed herein.

In process P2, cyber-attack data may be determined. That is, process P2 includes determining cyber-attack data relating to each of the plurality of cyber-attacks attempted on the computing system of and/or associated with the business. As discussed herein, the determined cyber-attack data may include data pertaining to and/or specific to each of the plurality of cyber-attacks attempted on the computing system of and/or associated with the business. Additionally, and as similarly discussed herein with respect to detecting each of the plurality of cyber-attacks (e.g., process P1), determining cyber-attack data relating to each of the plurality of cyber-attacks attempted on the computing system of and/or associated with the business may be accomplished using programs, IT components and/or systems included within the computing system of the business, as discussed herein. Additionally, although shown in FIG. 1 as being performed in succession and/or in a predefined order (e.g., P1 then P2), it is understood that processes P1 and P2 may be performed substantially at the same time and/or concurrently.

Determining cyber-attack data relating to each of the plurality of cyber-attacks attempted on the computing system of and/or associated with the business in process P2 may include a plurality of additional processes. Briefly turning to FIG. 2, various, non-limiting example processes for determining cyber-attack data in process P2 shown in FIG. 1 are depicted. For example, determining cyber-attack data relating to each of the plurality of cyber-attacks attempted on the computing system of and/or associated with the business (e.g., process P2; FIG. 1) may include determining an initial location of the plurality of cyber-attacks. That is, in process P2-1 the initial location of each of the plurality of the cyber-attacks attempted on the computing system of the business are determined. The initial location of each of the plurality of cyber-attacks may relate to a location with respect to the computing system in which the cyber-attack originally was submitted from and/or initiated. For example, the initial location of each of the plurality of cyber-attacks may include an external location (e.g., external computing system distinct from and accessing the business computing system over the internet) or an internal location (e.g., a computing device linked and/or directly connected to the network of the business computing system).

Additionally, or alternatively, determining cyber-attack data (e.g., process P2; FIG. 1) may include determining if each of the plurality of cyber-attacks are new to the computing system of the business. That is, in process P2-2, it may be determined if each of the plurality of cyber-attacks are new to the computing system of the business, or alternatively, if the computing system of the business has previously experienced and/or been attacked by similar cyber-attacks. As discussed herein, determining that any of the plurality of cyber-attacks are new to the computing system of the business may require obtaining additional information or data relating to the new cyber-attack from external sources (e.g., internet) to adequately analyze and mitigate the cyber-attack attempted on the computing system of the business. Alternatively, and as discussed herein, determining that any of the plurality of cyber-attacks are similar to previous cyber-attacks to the computing system of the business may result in obtaining information or data relating to the previous cyber-attack from to adequately analyze and mitigate the cyber-attack attempted on the computing system of the business.

Determining cyber-attack data (e.g., process P2; FIG. 1) may also include determining a type of cyber-attack for each of the plurality of cyber-attacks attempted on the computing system of the business. That is, in process P2-3, each of the plurality of cyber-attacks may be classified, and/or associated with a specific type of known cyber-attacks attempted on computing systems. For example, each of the plurality of cyber-attacks may be analyzed to determine if the cyber-attacks are SQL injection attacks, cross-site scripting attacks, pass-the-hash attacks, or various other known cyber-attacks that may target information system(s) stored on the IT component(s) of the infrastructure and/or computing device of the computing system of the business.

Additionally, or alternatively, determining cyber-attack data (e.g., process P2; FIG. 1) may include identifying a risk of attack for the plurality of cyber-attacks. Specifically, a risk of attack for each of the plurality of cyber-attacks attempted on the computing system of the business may be identified in process P2-4. They risk of attack may be identified using any suitable system, program, and/or process for assessing the severity of computer system security vulnerabilities. For example, the risk of attack for each of the plurality of cyber-attacks attempted on the computing system of the business in process P2-4 may be identified using the Common Vulnerability Scoring System (CVSS).

Determining cyber-attack data (e.g., process P2; FIG. 1) may also include generating a cyber-attack map for the plurality of cyber-attacks. That is, in process P2-5, a cyber-attack map for each of the plurality of cyber-attacks attempted on the computing system of the business may be generated. The generated cyber-attack maps for each of the plurality of cyber-attacks may include and/or identify at least one information system of the infrastructure of the computing system of the business in which the cyber-attack is targeting and/or intends to target. For example, the generated cyber-attack maps for each of the plurality of cyber-attacks may include and/or identify a first information system of the infrastructure of the computing system of the business in which each cyber-attack originates, and when applicable, at least one subsequent information system of the infrastructure of the computing system of the business in which each cyber-attack targets in conjunction with the first information system.

Although shown in succession and/or in a predefined order (e.g., P2-1-P2-5), it is understood that all of the discussed and depicted processes for determining cyber-attack data in process P2 may be performed and/or determined substantially at the same time and/or concurrently. Additionally, although process P2 is shown and discussed herein to include all of processes P2-1-P2-5, it is understood that any number of these processes shown and discussed herein with respect to FIG. 2 can be used to determine cyber-attack data in process P2.

Returning to FIG. 1, optional process P3 may be performed. That is, process P3 shown in phantom as optional, may include obtaining supplemental cyber-attack data relating to each of the plurality of cyber-attacks attempted on the computing system of the business. The supplemental cyber-attack data may be distinct from and/or may include distinct data or information about the plurality of cyber-attacks than the cyber-attack data determined in process P2. For example, the supplemental cyber-attack data obtained in process P3 may include data or information relating to identifying other systems that may be under similar cyber-attacks, actions for mitigating or stopping the cyber-attacks, a calculated risk of the cyber-attacks as determined by an independent source (e.g., U.S. Computer Emergency Readiness Team), and the like. Additionally, and distinct from the cyber-attack data determined in process P2, supplemental cyber-attack data obtained in process P3 may be obtained from at least one external source or system (e.g., distinct computing system, external storage, internet, social media applications, and so on) distinct from the computing system of the business. For example, the supplemental cyber-attack data obtained in process P3 may be obtained from the website or publications of the U.S. Computer Emergency Readiness Team, Security Incident forums, general News publications, Facebook or twitter notifications, and similar information sources.

In process P4, a business impact on the business for the plurality of cyber-attacks may be identified. Specifically, a business impact on the business for each of the plurality of cyber-attacks attempted on the computing system of the business may be identified. The identified business impact on the business may relate and/or correspond to an identifiable, measurable, or calculable severity or degree in which the business may be (negatively) affected if the cyber-attacks are not stopped, prevented, and/or mitigated. That is, the identified business impact on the business for each of the plurality of cyber-attacks may correspond and/or relate to a detriment in which the cyber-attack may have on the business. The identified business impact on the business for each of the plurality of cyber-attacks attempted on the computing system may be based on predetermined business impact data and the cyber-attack data determined in process P2. Additionally in non-limiting examples, the identified business impact on the business for each of the plurality of cyber-attacks attempted on the computing system of the business may also be based on the obtained supplemental cyber-attack data (e.g., process P3 shown in phantom). The predetermined business impact data may be data and/or information relating to the business, and/or information generated and/or defined by the business. For example, the predetermined business impact data may be a predetermined matrix, ranking, and/or classification of each of the information systems included within the infrastructure of the computing system, where the business determines the ranking or classification based on the information included within the information systems. In this example, the business may rank and/or classify an information system that includes client sensitive information (e.g., home addresses, credit card numbers, social security numbers, and the like) as having a higher business impact on the business if cyber-attacked than an information system including information relating to previously published advertisements for products sold by the business. In another non-limiting example, the predetermined business impact data may include predetermined and/or previously scheduled release/launch dates (e.g., product release day), events (e.g., sales events, conventions, etc.), press conferences, media publications, seminars, and the like that were previously defined and/or organized by the business. The predetermined business impact data may, for example, be stored within the computing system of the business as a result of the business defining the data.

Identifying the business impact on the business for each of the plurality of cyber-attacks in process P4 may include a plurality of additional processes. Briefly turning to FIG. 3, various, non-limiting example processes for identifying the business impact on the business in process P4 shown in FIG. 1 are depicted. For example, identifying the business impact on the business (e.g., process P4; FIG. 1) may include generating a list of the information systems targeted by each of the plurality of cyber-attacks. That is, in process P4-1 a list of every information system stored on the at least one IT component that are targeted by each of the plurality of cyber-attacks may be generated. The list of the information systems targeted by each of the plurality of cyber-attacks may be generated using the determined cyber-attack data from process P2. Specifically, the list of the information systems targeted by each of the plurality of cyber-attacks may be generated using, for example, the origin of each of the plurality of cyber-attacks determined in process P2-1, the type of cyber-attack for each of the plurality of cyber-attacks determined in process P2-3, and/or the cyber-attack map for each of the plurality of cyber-attacks generated in process P2-5.

Additionally, or alternatively, identifying the business impact on the business (e.g., process P4; FIG. 1) may include identifying supplemental business impact data. Specifically in process P4-2, supplemental business impact data for the information systems included in the generated list of the information systems targeted by each of the plurality of cyber-attacks (e.g., process P4-1) may be identified. The supplemental business impact data may be distinct from predetermined business impact data. That is, where the predetermined business impact data is defined by the business itself, the supplemental business impact data may be defined, generated, and/or produced independent from the business. For example, the supplemental business impact data may include important calendar dates (e.g., black Friday, Christmas, and the like), and/or media data or information relating to the business that is generated by a source independent from the business (e.g., news articles about the business, product reviews, online forums, "leaked" information, and the like). As a result of the data or information included within the supplemental business impact data, the supplemental business impact data identified in process P4-2 may, for example, be obtained from at least one external source or system (e.g., distinct computing system, external storage, internet, and so on) distinct from the computing system of the business. For example, the supplemental business impact data identified in process P4-2 may be obtained from a new website, a product review magazine, an online forum, and the like. Similar to the predetermined business impact data, the supplemental business impact data may aid in identifying the business impact on the business (e.g., identifiable severity in which the business may be affected by the cyber-attacks).

Identifying the business impact on the business in process P4 (see, FIG. 1) may also include identifying a hierarchy of the information systems. That is, in process P4-3, a hierarchy of the information systems included in the generated list of the information systems targeted by each of the plurality of cyber-attacks attempted on the computing system of the business may be identified. The hierarchy of the information systems may be identified in process P4-3 based on the predetermined business impact data and/or the identified supplemental business impact data. That is, the hierarchy of the information systems may be identified using the predetermined business impact data that may include a classification or rank for each of the information systems included on the generated list of information systems. Additionally, the supplemental business impact data may also be utilized in conjunction with the predetermined business impact data to identify and/or adjust the hierarchy of the information systems included in the generated list of the information systems targeted by each of the plurality of cyber-attacks.

For example, a list of three information systems targeted by cyber-attacks may be generated (e.g., process P4-1). In this example, the predetermined business impact data may rank and/or classify a cyber-attacked information system including information relating to the sale of Christmas products offered by the business as having a higher business impact on the business than a cyber-attacked information system including information for previously published advertisements. However, the predetermined business impact data may rank and/or classify the cyber-attacked information system including information relating to the sale of Christmas products offered by the business as having an equal business impact on the business as a cyber-attacked information system including information relating to the sale of Fourth of July products offered by the business. The respective information systems may be ranked and/or classified as having an equal business impact on the business because they both relate to sales of items by the business. However, after identifying the current or real-time date of the cyber-attacks on these information systems included in the generated list is November $1^{st}$ (e.g., identified supplemental business impact data of process P4-3), it may be determined that the information system including information relating to the sale of Christmas products has a higher business impact on the business than the information system including information relating to the sale of Fourth of July products. This may be identified as such because more customers or shoppers are looking to purchase Christmas products in November, than Fourth of July products.

Although shown in succession and/or in a predefined order (e.g., P4-1-P4-3), it is understood that all of the discussed and depicted processes for identifying the business impact on the business in process P4 may be performed and/or determined substantially at the same time and/or concurrently. Additionally, although process P4 is shown and discussed herein to include all of processes P4-1-P4-3, it is understood that any number of these processes shown and discussed herein with respect to FIG. 3 can be used to identify in process P4.

Returning to FIG. 1, process P5 may include prioritizing the plurality of cyber-attacks attempted on the computing system of the business. That is, the plurality of cyber-attacks attempted on the computing system of the business may be prioritized, organized, and/or arranged in a priority list. The plurality of cyber-attacks may be prioritized based on the identified business impact on the business for each of the plurality of cyber-attacks attempted on the computer system (e.g., process P4). Specifically, the plurality of cyber-attacks may be prioritized, organized, and/or arranged in a priority list based on a sequential order of the identified business impact on the business for each of the plurality of cyber-attacks. The prioritized plurality of cyber-attacks may also be prioritized based on the order of importance for mitigating the plurality of cyber-attacks. As such, prioritizing the plurality of cyber-attacks attempted on the computing system based on the identified business impact on the business may include, for example, identifying a first cyber-attack of the plurality of cyber-attacks to be mitigated first. The first identified cyber-attack may include and/or be associated with a first identified business impact on the business. Additionally, prioritizing the plurality of cyber-attacks attempted on the computing system based on the identified business impact on the business may also include, for example, identifying a second cyber-attack of the plurality of cyber-attacks to be mitigated after the first cyber-attack. The second identified cyber-attack may include and/or be associated with a second identified business impact on the business, where the second identified business impact on the business is less detrimental to the business than the first identified business impact of the first cyber-attack. As discussed herein, the prioritized plurality of cyber-attacks attempted on the computing system of the business may each be associated with, correspond to, and/or may each have an identified, targeted information system of the infrastructure of the computing system.

In process P6, a prioritized list of the plurality of cyber-attacks attempted on the computing system of the business is generated. That is, process P6 may include generating a prioritized list of the plurality of cyber-attacks attempted on the computing system of the business based on the prioritizing of the plurality of cyber-attacks in process P5. The generated prioritized list may be provided using any suitable communication device and/or component, and may be provided to a user or operator (e.g., IT specialist) of the computing system of the business. For example, the prioritize list may be generated as an electronic message displayed on an output device (e.g., computer screen) of the computing system, or alternatively may be generated as a physical print out from a printer in communication with the computing system. The prioritized list of the plurality of the cyber-attacks generated in process P6 may include the plurality of cyber-attacks ordered from the highest business impact on the business (e.g., the most detrimental to the business) to the lowest business impact on the business (e.g., the least detrimental to the business). Additionally, the prioritized list of the plurality of the cyber-attacks generated in process P6 may include mitigating actions for each of the plurality of cyber-attacks attempted on the computing system of the business. As discussed herein, the mitigating actions may include actions to be taken or performed on the computing system and/or portions of the infrastructure (e.g., IT component(s), information system(s), and the like) of the computing system that may mitigate and/or stop the cyber-attacks on the computing system of the business.

Figure 4:
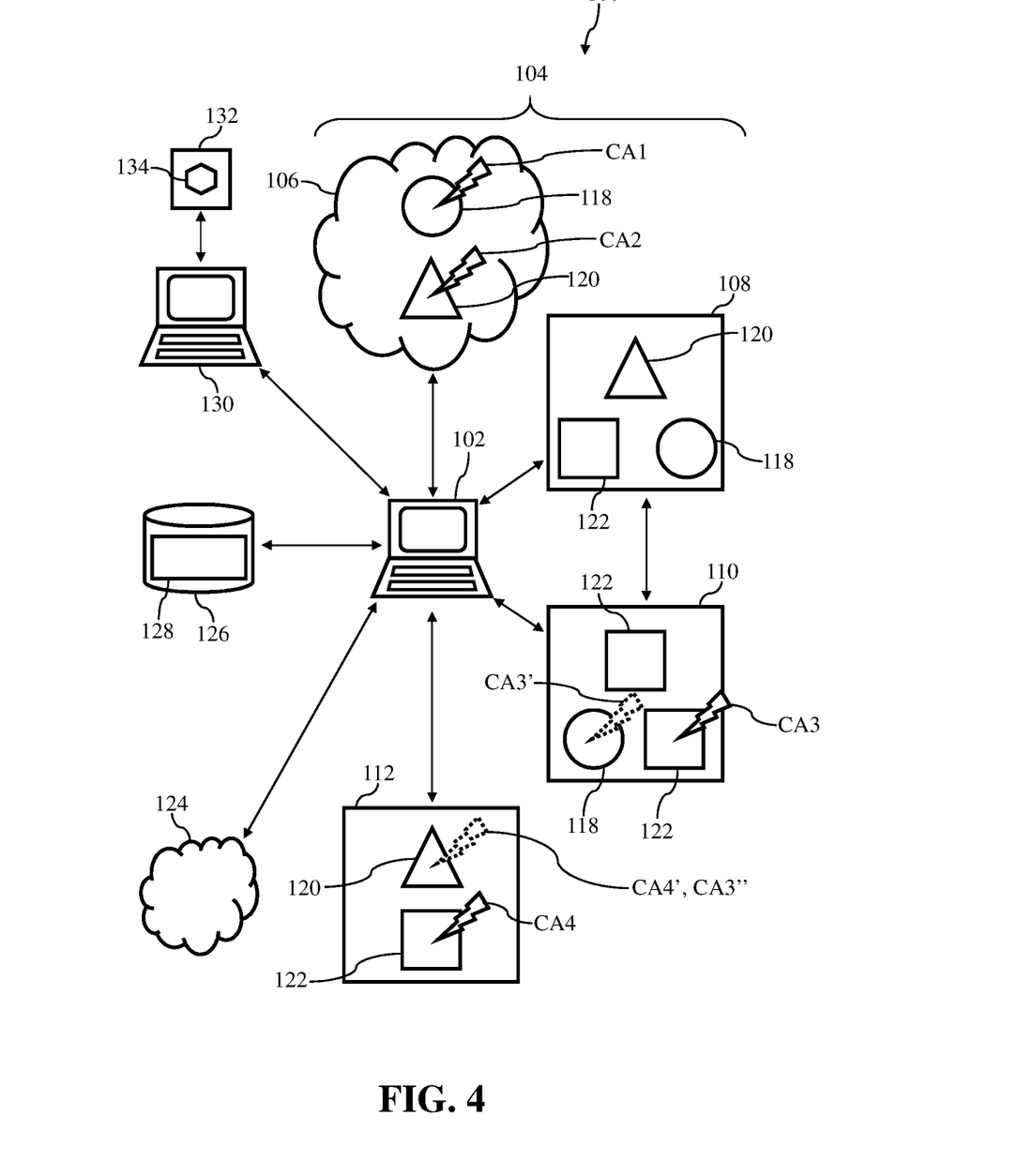
FIG. 4 depicts an environment that includes a computing system of a business undergoing a plurality of cyber-attacks, and a plurality of distinct systems and components in communication with the computing system of the business, according to embodiments.

FIG. 4 depicts an environment include a computing system of a business, and a plurality of distinct systems and components. Specifically, FIG. 4 depicts a computing system of a business undergoing a plurality of cyber-attacks, and a plurality of distinct systems and components in communication with the computing system of the business. The cyber-attacks attempted on the computing system of the business may be analyzed, prioritized, and/or mitigated by performing the processes P1-P6 discussed herein with respect to FIGS. 1-3. It is understood that similarly numbered and/or named components may function in a substantially similar fashion. Redundant explanation of these components has been omitted for clarity.

As shown in the non-limiting example of FIG. 4, computing system 100 for the business may include a computing device 102. Computing device 102 may be, for example, a centralized computing device 102 for computing system 100 of the business. Computing device 102 include any suitable computing device 102 that may be configured to perform processes P1-P6 to analyze cyber-attacks attempted on computing system 100 and/or targeting portions of computing device 102 as discussed herein. Although a single computing device 102 is shown in FIG. 4, it is understood that computing system 100 of the business may include multiple computing devices 102.

Computing device 102 of computing system 100 may include a computing infrastructure 104 that may be made up of a plurality of information technology (IT) components including information stored therein. Specifically, and as shown in the non-limiting of FIG. 4, computing device 102 may include a plurality IT components 106, 108, 110, 112. IT components 106, 108, 110, 112 of computing device 102 may be formed as any suitable component and/or device of computing device 102 that may be configured to store, operate, activate, run/engage (e.g., programs) and/or allow access to information or data stored thereon. For example, IT components 106, 108, 110, 112 may be configured as data collection or storage devices of computing device 102, wherein IT component 106 is a cloud storage device in communication with computing device 102, and IT components 108, 110, 112 are physical storage devices included within computing device 102. In additional (or alternative)

non-limiting examples, IT components 106, 108, 110, 112 may include processors or other similar components that may interact and/or engage information or data (e.g., computer programs or server information included within an IT component) stored therein for the function and/or operation of computing device 102, as discussed herein.

The information or data included within IT components 106, 108, 110, 112 may be included within information systems 118, 120, 122. Information systems 118, 120, 122 may be included and/or stored within each IT component 106, 108, 110, 112. Additionally, information systems 118, 120, 122 included and/or stored within each IT component 106, 108, 110, 112 may be dependent on, for example, the component or device type for each IT component 106, 108, 110, 112 of computing system 102. As discussed herein, information systems 118, 120, 122 may include information and/or data relating to the business associated with computing device 102 and/or computing system 100. Additionally, and as discussed herein, each of information system 118, 120, 122 of computing device 102 may be classified and/or ranked by the business based on the information or data included within the information systems 118, 120, 122. The classification and/or ranking may be associated with an identifiable severity in which the business may be negatively or detrimentally affected if cyber-attacks targeting the information system 118, 120, 122 are not stopped or mitigated. In the non-limiting example, information system 118 may be ranked as having the lowest detrimental effect on the business, information system 120 may be ranked as having an intermediate detrimental effect on the business, and information system 122 may be ranked as having the highest detrimental effect on the business.

As shown in FIG. 4, computing device 102 of computing system 100 for the business may be linked, and/or in communication with a plurality of additional components and/or systems in the environment. At least a portion of the additional components may be external to and/or distinct from computing device 102 and/or computing system 100 of the business. For example, computing device 102 may be in communication with and/or may have access to the internet 124, and/or an external storage database or component 126 (hereafter, "external storage component 126") including additional information systems 128 including data and/or information. Additionally, computing device 102 may be in communication with and/or may have access to a distinct computing device 130 including a distinct IT component 132 and a distinct, information system 134 included and/or stored on distinct IT component 132. In one non-limiting example, distinct computing device 130 may be included within a distinct computing system, distinct from computing system 100. In another non-limiting example, distinct computing device 130 may be a part of and/or may be included within computing system 100, along with computing device 102.

As shown in FIG. 4, computing device 102 of computing system 100 associated with the business may also include a plurality of cyber-attacks CA1-CA4. Specifically, computing system 100 may include a plurality of detected, real-time cyber-attacks CA1-CA4 that are being attempted on computing system 100 simultaneously and/or at the same time. As discussed herein, cyber-attacks CA1-CA4 attempted on computing system 100 may target information systems 118, 120, 122 stored and/or included within IT components 106, 108, 112 of infrastructure 104 of computing system 100. In the non-limiting example shown in FIG. 4, a first cyber-attack CA1 may target information system 118 of IT component 106, a second cyber-attack CA2 may target information system 120 of IT component 106, a third cyber-attack CA3 may target information system 122 of IT component 110, and a fourth cyber-attack CA4 may target information system 122 of IT component 112.

An example of analyzing cyber-attacks CA1-CA4 attempted on computing system 100 of the business using process P1-P6 of FIG. 1 are discussed herein with respect to FIG. 4. It is understood that similarly numbered and/or named components may function in a substantially similar fashion. Redundant explanation of these components has been omitted for clarity.

Initially, computing system 100, and specifically computing device 102 of computing system 100, may detect cyber-attacks CA1-CA4 attempted on computing system 100 of the business. Detecting cyber-attacks CA1-CA4 may include detecting and/or determining the number of cyber-attacks attempted on computing system 100 and targeting various information systems 118, 120, 122 included within computing device 102 of computing system 100. Detecting the cyber-attacks CA1-CA4 attempted on computing system 100 of the business as shown in FIG. 4 may correspond to process P1 of FIG. 1.

Next, cyber-attack data for each of the plurality of detected cyber-attacks CA1-CA4 attempted on the computing system 100 of the business may be determined. The cyber-attack data may be determined using programs, IT components and/or systems included within the computing device 102 and/or computing system 100 of the business. Determining the cyber-attack data may include, for example, determining the origin of each cyber-attack CA1-CA4 within computing system 100, determining if any of the cyber-attacks CA1-CA4 are new to computing device 102 and/or computing system 100 of the business, determining a type of cyber-attack for each of the plurality of cyber-attacks CA1-CA4, identifying a risk of attack for the plurality of cyber-attacks CA1-CA4, and/or generating a cyber-attack map for each cyber-attack CA1-CA4 attempted on computing device 102 and/or computer system 100 of the business. In non-limiting examples, computing system 100 and/or computing device 102 may determine that first cyber-attack CA1 originates information system 118 on IT component 106, second cyber-attack CA2 originates information system 120 on IT component 106, third cyber-attack CA3 originates information system 122 on IT component 110, and fourth cyber-attack CA4 originates information system 122 on IT component 112. Additionally in the non-limiting example shown in FIG. 4, it may be determined that first cyber-attack CA1, second cyber-attack CA2, and third cyber-attack CA3 may be determined to be similar to previous cyber-attacks experienced by and/or attempted on computing system 100 of the business. However, the fourth cyber-attack CA4 may be determined to be a new cyber-attack that has never been attempted on computing system 100 of the business. Furthermore in the non-limiting example shown in FIG. 4, cyber-attack maps may be generated for third cyber-attack CA3 and/or fourth cyber-attack CA4. Specifically, the cyber-attack map for third cyber-attack CA3 may include an identified first information system of infrastructure 104 of computing system 100 of the business in which third cyber-attack originates. Additionally, the cyber-attack map for third cyber-attack CA3 may include identifying at least one subsequent information system of infrastructure 104 of computing system 100 of the business in which third cyber-attack CA3 targets in conjunction with the first information system. In this non-limiting example, third cyber-attack CA3 may originate in information system 122 in IT component 110, and may subsequently be mapped to information system 118 in IT component 110, and in some examples, information system 120 in IT component 112. In another non-limiting example, a generated cyber-attack map for the fourth cyber-attack CA4 may include fourth cyber-attack CA4 originating in information system 122 in IT component 112, and may subsequently be mapped to information system 120 in IT component 112. Determining the cyber-attack data as shown in FIG. 4 may correspond to process P2 of FIG. 1, and process P2-1-P2-5 of FIG. 2, respectively.

In the non-limiting example of FIG. 4, supplemental cyber-attack data may also be obtained by computing device 102 and/or computing system 100 of the business. The supplemental cyber-attack data relating to each of the plurality of cyber-attacks CA1-CA4 attempted on computing system 100 of the business. The supplemental cyber-attack data may be distinct from and/or may include distinct data or information about the plurality of cyber-attacks CA1-CA4 than the cyber-attack data. Additionally, supplemental cyber-attack data may be obtained from a source, system, and/or component distinct from computing device 102 and/or computing system 100. For example, supplemental cyber-attack data may include data and/or information relating to the fourth cyber-attack CA4 may be determined to be a new cyber-attack that has never been attempted on computing system 100 of the business. This supplemental cyber-attack data may be obtained by computing device 102 from internet 124, external storage component 126, and/or distinct computing device 130. Obtaining the supplemental cyber-attack data as shown in FIG. 4 may correspond to process P3 of FIG. 1.

Next, a business impact on the business for each of the plurality of cyber-attacks CA1-CA4 attempted on computing system 100 of the business may be identified. The identified business impact on the business for each of the plurality cyber-attacks CA1-CA4 may be based on predetermined business impact data, the determined cyber-attack data, and/or the obtained supplemental cyber-attack data. The predetermined business impact data may be data and/or information relating to the business, and/or information generated and/or defined by the business and stored within computing device 102 and/or computing system 100. Identifying the business impact on the business for each of the plurality of cyber-attacks CA1-CA4 attempted on computing system 100 may include generating a list of information systems 118, 120, 122 targeted by cyber-attacks CA1-CA4. In the non-limiting example, the generated list of information systems 118, 120, 122 may include information system 118 on IT component 106 being targeted by first cyber-attack CA1, information system 120 on IT component 106 being targeted by second cyber-attack CA2, information system 122 on IT component 110 being targeted by third cyber-attack CA3, and information system 122 on IT component 112 being targeted by fourth cyber-attack CA4. Identifying the business impact on the business for each of the plurality of cyber-attacks CA1-CA4 may also include identifying supplemental business impact data form information system 118, 120, 122 included in the generated list of information systems 118, 120, 122. The supplemental business impact data may be distinct from predetermined business impact data, and may be defined, generated, and/or produced independent from the business. For example, the supplemental business impact data may be identified by computing device 102 by receiving information or data from internet 124, external storage component 126, and/or distinct computing device 130. Finally, identifying the business impact on the business for each of the plurality of cyber-attacks CA1-CA4 may include identifying a hierarchy of information system 118, 120, 122 included in the generated list of information system 118, 120, 122. The hierarchy of the information systems 118, 120, 122 use and/or may be based on the predetermined business impact data and/or the identified supplemental business impact data. That is, the hierarchy of the information systems 118, 120, 122 may be identified using the predetermined business impact data that may include a classification or rank for each of the information systems 118 (e.g., lowest detrimental affect), 120 (e.g., intermediate detrimental affect), 122 (e.g., highest detrimental affect) included on the generated list of information systems 118, 120, 122. In the non-limiting example shown in FIG. 1, the hierarchy of the information system 118, 120, 122 included in the generated list of information systems 118, 120, 122 may determine that order of the information systems 118, 120, 122 ranked or organized by highest detrimental effect to lowest detrimental effect is as follows: (1) information system 122 on IT component 112 being targeted by fourth cyber-attack CA4, (2) information system 122 on IT component 110 being targeted by third cyber-attack CA3, (3) information system 120 on IT component 106 being targeted by second cyber-attack CA2, and (4) information system 118 on IT component 106 being targeted by first cyber-attack CA1. Although including the same detrimental effect (e.g., highest detrimental effect) information system 122 on IT component 112 being targeted by fourth cyber-attack CA4 may be above information system 122 on IT component 110 being targeted by third cyber-attack CA3 in the identified hierarchy based on supplemental business impact data, as discussed herein. Identifying the business impact on the business for each of the plurality of cyber-attacks as shown in FIG. 4 may correspond to process P4 of FIG. 1, and process P4-1-P4-3 of FIG. 3, respectively.

In the non-limiting example, the plurality of cyber-attacks CA1-CA4 attempted on computing system 100 of the business may be prioritized. That is, the plurality of cyber-attacks CA1-CA4 attempted on the computing system 100 of the business may be prioritized, organized, and/or arranged in a priority list. The plurality of cyber-attacks CA1-CA4 attempted on computing system 100 of the business may be prioritized, organized, and/or arranged in a priority list based on a sequential order of the identified business impact on the business for each of the plurality of cyber-attacks CA1-CA4, and based on the order of importance for mitigating the plurality of cyber-attacks. Continuing the non-limiting example above, the plurality of cyber-attacks CA1-CA4 attempted on computing system 100 may be prioritized as follows: (1) fourth cyber-attack CA4 targeting information system 122 on IT component 112, (2) third cyber-attack CA3 targeting information system 122 on IT component 110, (3) second cyber-attack CA2 targeting information system 120 on IT component 106, and (4) first cyber-attack CA1 targeting information system 118 on IT component 106. Prioritizing the plurality of cyber-attacks CA1-CA4 attempted on computing system 100 as shown in FIG. 4 may correspond to process P5 of FIG. 1.

Finally, a prioritized list of the plurality of cyber-attacks CA1-CA4 attempted on the computing system 100 of the business may be generated. The generated prioritized list may be provided to a user or operator (e.g., IT specialist)(not shown) of computing system 100 of the business using any suitable communication device and/or input/output component (e.g., printer, computer monitor) in communication with computing device 102 and/or computing system 100. The generated prioritized list of the plurality of the cyber-attacks CA1-CA4 may include the plurality of cyber-attacks CA1-CA4 ordered from the highest business impact on the business to the lowest business impact on the business. For example, the generated prioritized list of the plurality of cyber-attacks CA1-CA4 may include the following: (1) fourth cyber-attack CA4 targeting information system 122 on IT component 112, (2) third cyber-attack CA3 targeting information system 122 on IT component 110, (3) second cyber-attack CA2 targeting information system 120 on IT component 106, and (4) first cyber-attack CA1 targeting information system 118 on IT component 106. Additionally, the generated prioritized list of the plurality of the cyber-attacks CA1-CA4 may include mitigating actions for each of the plurality of cyber-attacks CA1-CA4 attempted on the computing system 100 of the business and/or targeted toward information systems 118, 120, 122. As discussed herein, the mitigating actions may include actions to be taken or performed on computing device 102, computing system 100 and/or portions of infrastructure 104 (e.g., IT components 106, 108, 110, 112, information system 118, 120, 122, and the like) of computing system 100 that may mitigate and/or stop the cyber-attacks CA1-CA4 on computing system 100 of the business. Generating the prioritized list of the plurality of cyber-attacks CA1-CA4 attempted on the computing system 100 as shown in FIG. 4 may correspond to process P6 of FIG. 1.

Figure 5:
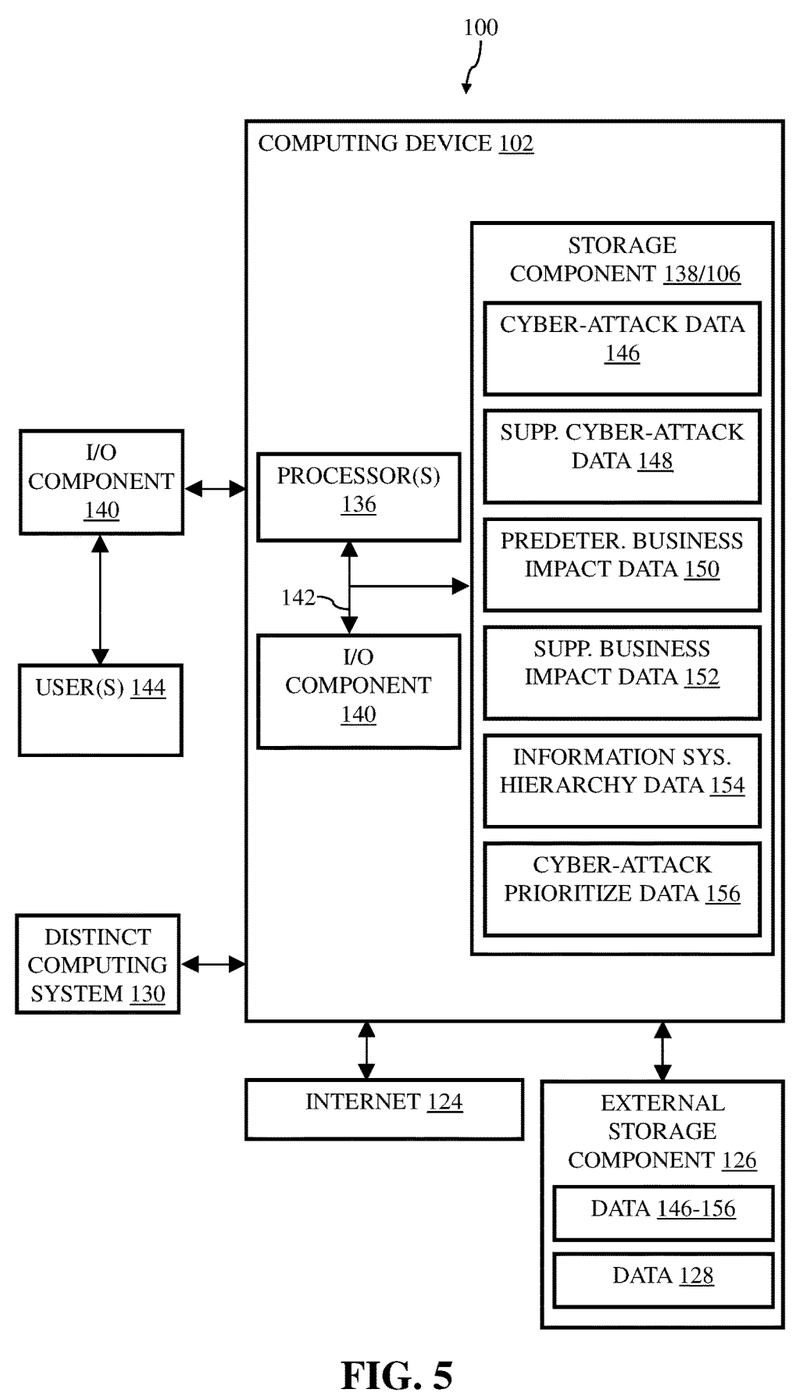
FIG. 5 depicts a schematic view of a computing system of a business configured to analyze a plurality of cyber-attacks attempted on the computing system, according to embodiments.

FIG. 5 depicts a schematic view of a computing environment or system 100 (hereafter, "computing system 100"), and the various components included within computing system 100. In the non-limiting example shown in FIG. 5, and similar to the non-limiting example discussed herein with respect to FIG. 4, computing system 100 may include at least one computing device 102 that may be configured to analyze cyber-attacks CA1-CA4 (see, FIG. 4) attempted on computing system 100 of a business by performing the processes P1-P6 discussed herein with respect to FIGS. 1-3. It is understood that similarly numbered and/or named components may function in a substantially similar fashion. Redundant explanation of these components has been omitted for clarity.

It is understood that computing device(s) 102 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 100 may include any type of computing device(s) 102 and for example includes at least one processor 136, storage component 138 (e.g., IT component 106; FIG. 4), input/output (I/O) component(s) 140 (including a printer discussed herein), and a communications pathway 142. In general, processor(s) 136 execute program code which is at least partially fixed in storage component 138. While executing program code, processor(s) 136 can process data, which can result in reading and/or writing transformed data from/to storage component 138 and/or I/O component(s) 140 for further processing. The pathway 142 provides a communications link between each of the components in computing device(s) 102. I/O component 140 can comprise one or more human I/O devices, which enables user 144 to interact with computing device(s) 102 to analyze and/or mitigate the attempted cyber-attacks, as discussed herein. Computing device(s) 102 may also be implemented in a distributed manner such that different components reside in different physical locations.

Storage component 138 may also include modules, data and/or electronic information relating to various other aspects of computing system 100. Specifically, operational modules, electronic information, and/or data relating to cyber-attack data 146, supplemental cyber-attack data 148, predetermined business impact data 150, supplemental business impact data 152, information systems hierarchy data 154, and cyber-attack prioritization data 156. The operational modules, information, and/or data may include the required information and/or may allow computing system 100, and specifically computing device 102, to perform the processes discussed herein for analyzing a plurality of cyber-attacks.

Computing system 100, and specifically computing device 102 of computing system 100, may also be in communication with external storage component 126. External storage component 126 may be configured to store various modules, data and/or electronic information relating to various other aspects of computing system 100, similar to storage component 138 of computing device(s) 102. Additionally, external storage component 128 may be configured to share (e.g., send and receive) data and/or electronic information with computing device(s) 102 of Computing system 100. In the non-limiting example shown in FIG. 5, external storage component 126 may include any or all of the operational modules and/or data shown to be stored on storage component 138 (e.g., data 146-156). Additionally, and as discussed herein with respect to FIG. 4, external storage component 126 may also include additional data, information and/or information system 128. In a non-limiting example, external storage component 126 may be a cloud-based storage component or system.

In a non-limiting example shown in FIG. 5, computing device(s) 102 may be in communication with and/or may be configured to share (e.g., send and receive) data and/or electronic information with a distinct computing device(s) 130 of a distinct computing system, or alternatively a distinct computing device 130 of computing system 130. Additionally in this non-limiting example, and as similarly discussed herein with respect to FIG. 4, distinct computing system 130 may include any or all of the operational modules and/or data shown to be stored on storage component 138 (e.g., data 146-156), as well as other IT components 132 including additional data, information, and/or information systems 134 (see, FIG. 4). Additionally as shown in FIG. 5, and discussed herein with respect to FIG. 4, computing device(s) 102 may be in communication with and/or may be configured to share (e.g., receive) data and/or electronic information with internet 124.

Furthermore, it is understood that computing device(s) 102 of computing system 100 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, and then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for analyzing a plurality of cyber-attacks, the method comprising:
    detecting, with a first computing system, each of the plurality of cyber-attacks attempted on a computing system of a business, each of the plurality of cyber-attacks targeting information systems stored on at least one information technology (IT) component of an infrastructure of the computing system of the business;

determining cyber-attack data relating to each of the plurality of cyber-attacks attempted on the computing system of the business, wherein determining the cyber-attack data includes:
  determining an initial location of each of the plurality of cyber-attacks attempted on the computing system of the business; and
  determining whether the initial location is external to the computing system of the business;
identifying a business impact on the business for each of the plurality of cyber-attacks attempted on the computing system of the business, the identified business impact on the business for each of the plurality of cyber-attacks based on predetermined business impact data and the determined cyber-attack data, wherein identifying the business impact on the business for each of the plurality of cyber-attacks attempted on the computing system of the business comprises:
  generating a list of the information systems stored on the at least one IT component that are targeted by each of the plurality of cyber-attacks using the determined cyber-attack data;
  obtaining supplemental business impact data for the information systems included in the generated list of the information systems targeted by each of the plurality of cyber-attacks, the supplemental business impact data distinct from the predetermined business impact data, wherein the supplemental business impact data is obtained from a source that is external to and distinct from the first computing system; and
  identifying a hierarchy of the information systems included in the generated list of the information systems targeted by each of the plurality of cyber-attacks, the identified hierarchy of the information systems indicating a relative importance of the respective information systems and being based on the predetermined business impact data and the obtained supplemental business impact data;
prioritizing the plurality of cyber-attacks attempted on the computing system of the business based on the identified business impact on the business for each of the plurality of cyber-attacks attempted on the computing system of the business, wherein the prioritizing includes generating a prioritized list that includes a sequential order in which to mitigate each cyber-attack of the plurality of cyber-attacks; and
obtaining supplemental cyber-attack data relating to each of the plurality of cyber-attacks attempted on the computing system of the business, the supplemental cyber-attack data obtained from at least one external system distinct from the computing system of the business, wherein the supplemental cyber-attack data identifies at least one other system distinct from the computing system of the business that may be under similar cyber-attacks.

2. The method of claim 1, wherein determining the cyber-attack data relating to each of the plurality of cyber-attacks attempted on the computing system of the business further comprises:
  determining if each of the plurality of cyber-attacks are new to the computing system of the business;
  determining a type of cyber-attack for each of the plurality of cyber-attacks attempted on the computing system of the business;
  identifying a risk of attack for each of the plurality of cyber-attacks attempted on the computing system of the business; and
  generating a cyber-attack map for each of the plurality of cyber-attacks attempted on the computing system of the business, the generated cyber-attack map for each of the plurality of cyber-attacks identifying:
    a first information system of the infrastructure of the computing system of the business in which the cyber-attack originates; and
    at least one, subsequent information system of the infrastructure in which the cyber-attack targets in conjunction with the first information system.

3. The method of claim 1, wherein identifying the business impact on the business for each of the plurality of cyber-attacks attempted on the computing system of the business is based on the obtained supplemental cyber-attack data.

4. The method of claim 1, wherein prioritizing the plurality of cyber-attacks attempted on the computing system of the business further comprise at least one of:
  identifying a first cyber-attack of the plurality of cyber-attacks to be mitigated first, the first identified cyber-attack including a first identified business impact on the business;
  identifying a second cyber-attack of the plurality of cyber-attacks to be mitigated after the first cyber-attack, the second identified cyber-attack including a second identified business impact on the business,
  wherein the second identified business impact of the second cyber-attack is less detrimental to the business than the first identified business impact of the first cyber-attack.

5. The method of claim 1, wherein the prioritized list includes:
  the plurality of cyber-attacks ordered from the highest business impact on the business to the lowest business impact on the business; and
  mitigating actions for each of the plurality of cyber-attacks.

6. The method of claim 1, wherein the supplemental cyber-attack data identifies a calculated risk of the cyber-attacks as determined by an independent source.

7. A computer program product for analyzing a plurality of cyber-attacks, the computer program product comprising:
  one or more computer-readable storage medium and program instructions stored on at least one of the one or more computer-readable storage medium, the program instructions executable by a processor to cause the processor to perform a method comprising:
    detecting each of the plurality of cyber-attacks attempted on a computing system of a business, each of the plurality of cyber-attacks targeting information systems stored on at least one information technology (IT) component of an infrastructure of the computing system of the business;
    determining cyber-attack data relating to each of the plurality of cyber-attacks attempted on the computing system of the business, wherein determining the cyber-attack data includes:
      determining an initial location of each of the plurality of cyber-attacks attempted on the computing system of the business; and
      determining whether the initial location is internal to the computing system of the business;
    identifying a business impact on the business for each of the plurality of cyber-attacks attempted on the computing system of the business, the identified business impact on the business for each of the plurality of cyber-attacks based on predetermined business impact data and the determined cyber-attack data, wherein identifying the business impact on the business for each of the plurality of cyber-attacks attempted on the computing system of the business comprises:

generating a list of the information systems stored on the at least one IT component that are targeted by each of the plurality of cyber-attacks using the determined cyber-attack data;

obtaining supplemental business impact data for the information systems included in the generated list of the information systems targeted by each of the plurality of cyber-attacks, the supplemental business impact data distinct from the predetermined business impact data, wherein the supplemental business impact data is obtained from a source that is external to and distinct from a first computing system that includes the processor; and identifying a hierarchy of the information systems included in the generated list of the information systems targeted by each of the plurality of cyber-attacks, the identified hierarchy of the information systems indicating a relative importance of the respective information systems and being based on the predetermined business impact data and the obtained supplemental business impact data;

prioritizing the plurality of cyber-attacks attempted on the computing system of the business based on the identified business impact on the business for each of the plurality of cyber-attacks attempted on the computer system of the business, wherein the prioritizing includes generating a prioritized list that includes a sequential order in which to mitigate each cyber-attack of the plurality of cyber-attacks; and obtaining supplemental cyber-attack data relating to each of the plurality of cyber-attacks attempted on the computing system of the business, the supplemental cyber-attack data obtained from at least one external system distinct from the computing system of the business, wherein the supplemental cyber-attack data identifies a calculated risk of the cyber-attacks as determined by an independent source.

8. The computer program product of claim 7, wherein determining cyber-attack data relating to each of the plurality of cyber-attacks attempted on the computing system of the business further comprises:

determining if each of the plurality of cyber-attacks are new to the computing system of the business; and determining a type of cyber-attack for each of the plurality of cyber-attacks attempted on the computing system of the business.

9. The computer program product of claim 7, wherein identifying the business impact on the business for each of the plurality of cyber-attacks attempted on the computing system of the business utilizes the supplemental cyber-attack data.

10. The computer program product of claim 9, wherein the supplemental cyber-attack data identified at least one other system distinct from the computing system of the business that may be under similar cyber-attacks.

11. The computer program product of claim 7, wherein prioritizing the plurality of cyber-attacks attempted on the computing system of the business further comprises at least one of:

identifying a first cyber-attack of the plurality of cyber-attacks to be mitigated first, the first identified cyber-attack including a first identified business impact on the business; and identifying a second cyber-attack of the plurality of cyber-attacks to be mitigated after the first cyber-attack, the second identified cyber-attack including a second identified business impact on the business, wherein the second identified business impact of the second cyber-attack is less detrimental to the business than the first identified business impact of the first cyber-attack.

12. The computer program product of claim 7, wherein the prioritized list includes:

the plurality of cyber-attacks ordered from the highest business impact on the business to the lowest business impact on the business; and mitigating actions for each of the plurality of cyber-attacks.

13. A computing system of a business for analyzing a plurality of cyber-attacks, the computing system comprising:

a memory; and a processor communicatively coupled to the memory, wherein the processor is configured to perform a method comprising:

detecting each of the plurality of cyber-attacks attempted on the computing system of the business, each of the plurality of cyber-attacks targeting information systems stored on at least one information technology (IT) component of an infrastructure of the computing system of the business; and determining cyber-attack data relating to each of the plurality of cyber-attacks attempted on the computing system of the business, wherein determining the cyber-attack data includes:

determining an initial location of each of the plurality of cyber-attacks attempted on the computing system of the business; and determining whether the initial location is external to the computing system of the business;

identifying a business impact on the business for each of the plurality of cyber-attacks attempted on the computing system of the business, the identified business impact on the business for each of the plurality of cyber-attacks based on predetermined business impact data and the cyber-attack data, wherein identifying the business impact on the business for each of the plurality of cyber-attacks attempted on the computing system of the business comprises:

generating a list of the information systems stored on the at least one IT component that are targeted by each of the plurality of cyber-attacks using the determined cyber-attack data;

obtaining supplemental business impact data for the information systems included in the generated list of the information systems targeted by each of the plurality of cyber-attacks, the supplemental business impact data distinct from the predetermined business impact data, wherein the supplemental business impact data is obtained from a source that is external to and distinct from a first computing system that includes the processor; and identifying a hierarchy of the information systems included in the generated list of the information systems targeted by each of the plurality of cyber-attacks, the identified hierarchy of the information systems indicating a relative importance of the respective information systems and being based on the predetermined business impact data and the obtained supplemental business impact data;

prioritizing the plurality of cyber-attacks attempted on the computing system of the business based on the identified business impact on the business for each of the plurality of cyber-attacks attempted on the computing system of the business, wherein the prioritizing includes generating a prioritized list that includes a sequential order in which to mitigate each cyber-attack of the plurality of cyber-attacks; and obtaining supplemental cyber-attack data relating to each of the plurality of cyber-attacks attempted on the computing system of the business, the supplemental cyber-attack data obtained from at least one external system distinct from the computing system of the business, wherein the supplemental cyber-attack data identifies at least one other system distinct from the computing system of the business that may be under similar cyber-attacks.

14. The computing system of claim 13, wherein determining the cyber-attack data relating to each of the plurality of cyber-attacks attempted on the computing system of the business includes:

determining if each of the plurality of cyber-attacks are new to the computing system of the business.

15. The computing system of claim 13, wherein the method further comprises:

obtaining supplemental cyber-attack data relating to each of the plurality of cyber-attacks attempted on the computing system of the business, the supplemental cyber-attack data obtained from at least one external system that is distinct from the computing system of the business.

16. The computing system of claim 13, wherein prioritizing the plurality of cyber-attacks attempted on the computing system of the business includes at least one of:

identifying a first cyber-attack of the plurality of cyber-attacks to be mitigated first, the first identified cyber-attack including a first identified business impact on the business; and identifying a second cyber-attack of the plurality of cyber-attacks to be mitigated after the first cyber-attack, the second identified cyber-attack including a second identified business impact on the business, wherein the second identified business impact of the second cyber-attack is less detrimental to the business than the first identified business impact of the first cyber-attack.

17. The computing system of claim 13, wherein the prioritized list includes:

the plurality of cyber-attacks ordered from the highest business impact on the business to the lowest business impact on the business; and mitigating actions for each of the plurality of cyber-attacks.

\* \* \* \* \*